United States Patent
Booth et al.

(10) Patent No.: US 8,242,644 B2
(45) Date of Patent: Aug. 14, 2012

(54) ARRANGEMENT FOR COOLING OF AN ELECTRICAL MACHINE

(75) Inventors: James Kenneth Booth, Brande (DK); Uffe Eriksen, Horsens (DK); Soeren Gundtoft, Fredericia (DK); Jacob Blach Nielsen, Silkeborg (DK)

(73) Assignee: Siemens Aktiengesellschaft, München (DE)

( * ) Notice: Subject to any disclaimer, the term of this patent is extended or adjusted under 35 U.S.C. 154(b) by 330 days.

(21) Appl. No.: 12/606,328

(22) Filed: Oct. 27, 2009

(65) Prior Publication Data

US 2010/0102652 A1   Apr. 29, 2010

(30) Foreign Application Priority Data

Oct. 28, 2008  (EP) .................................. 08018800

(51) Int. Cl.
*H02K 9/08* (2006.01)
(52) U.S. Cl. .......................... 310/52; 310/64
(58) Field of Classification Search .............. 310/54, 310/58, 64, 52, 53, 59
See application file for complete search history.

(56) References Cited

U.S. PATENT DOCUMENTS

| | | | |
|---|---|---|---|
| 2,970,232 A * | 1/1961 | Kilbourne | 310/54 |
| 3,727,085 A * | 4/1973 | Goetz et al. | 310/54 |
| 4,139,057 A * | 2/1979 | Klaar | 165/104.13 |
| 4,728,840 A * | 3/1988 | Newhouse | 310/113 |
| 5,012,860 A * | 5/1991 | Mukherjee | 165/47 |
| 6,399,411 B1* | 6/2002 | Hori et al. | 438/62 |
| 7,160,086 B2* | 1/2007 | Maceyka et al. | 417/368 |
| 2005/0035673 A1* | 2/2005 | Lafontaine et al. | 310/58 |
| 2007/0024132 A1 | 2/2007 | Salamah et al. | |
| 2007/0024299 A1* | 2/2007 | Itakura et al. | 324/754 |

FOREIGN PATENT DOCUMENTS

EP   1873893 A2   1/2008
WO   WO 01/21956 A1   3/2001

* cited by examiner

*Primary Examiner* — Quyen Leung
*Assistant Examiner* — Naishadh Desai

(57) ABSTRACT

In one aspect, an arrangement for cooling of an electrical machine is provided. The arrangement includes a rotor and a stator of the electrical machine, while an air-gap is between the rotor and the stator. The electrical machine includes an air-cooling-arrangement, which circulates air inside the electrical machine. The electrical machine includes a liquid-cooling-arrangement, which circulates cooling-liquid inside the electrical machine. The air-cooling arrangement and the liquid-cooling-arrangement are connected by an air-to-liquid heat-exchanger, which is applied to transport heat out from the electrical machine by the cooling-liquid.

7 Claims, 2 Drawing Sheets

Section A-A

Detail

ARRANGEMENT FOR COOLING OF AN ELECTRICAL MACHINE

CROSS REFERENCE TO RELATED APPLICATIONS

This application claims priority of European Patent Office application No. 08018800.6 EP filed Oct. 28, 2008, which is incorporated by reference herein in its entirety.

FIELD OF INVENTION

The invention relates to a cooling-arrangement of an electrical machine.

BACKGROUND OF INVENTION

In a preferred embodiment the invention relates to a huge electrical machine, which is totally enclosed by a shell or housing.

Electrical machines needs cooling to dissipate heat, which is generated during its operation by an ohmic resistance, by iron hysteresis, etc.

It is possible to cool a small electrical machine by a heat-transfer from the inside of the machine to its surface.

This is not possible for a large machine, which shows a relatively small surface per power rating and heat generation.

When a machine is installed indoor at a dry atmosphere it is possible to operate the machine without a housing, so a cooling is achieved by the circulation of ambient air through the machine.

But when the machine is installed under harsh conditions, like it is for generators being used in offshore wind-turbines, the electrical machine need to be totally enclosed, so ambient air is not allowed to circulate through the machine. For this application dedicated cooling-systems are required.

SUMMARY OF INVENTION

One very common cooling-method is the circulation of air or another gaseous medium inside the electrical machine, while the cooling-medium is kept cool by a heat-exchanger. This cooling method disadvantageously requires large gas-to-air or gas-to-water heat-exchangers. Furthermore considerable additional power is required to circulate the cooling-medium inside the machine.

Another cooling-method of a generator, which shows a stator and a rotor, is the circulation of a liquid on a first side of the stator. This first side to be cooled is opposite to an air gap, which is between the stator and the rotor. The stator shows a number of stacked laminate-plates, which carries metal-windings of stator-coils, so the heat is transferred from the metal-windings through the laminate-plates to the cooling-medium by conduction.

This cooling method suffers from a considerable temperature-gradient, which exists between the windings of the stator and the cooling-medium—due to a moderate heat-conductivity of the laminate-plates. Because of this it is difficulty to maintain a predetermined winding-temperature, which is below a required maximum-value.

Furthermore, this cooling-method is not as effective as the air-cooling, because winding-heads of the coils and the rotor itself is not cooled in the same way.

Another cooling-method is to bring in liquid or gas for cooling-purposes into slots of the laminate-plates, while these slots are used to carry the metal-windings. To bring in the cooling-medium hollow ceramic-cooling-pipes are used, which are expensive and difficulty to handle.

The problem is that there is still no direct cooling-effect of the winding-heads and of the rotor.

It is aim of the present invention, to provide an improved arrangement for cooling of an electrical machine.

This aim is solved by the features of the independent claims. Preferred embodiments of the invention are described within the subsequent claims.

The inventive arrangement for cooling of an electrical machine comprises a rotor and a stator of the electrical machine, while an air-gap is between the rotor and the stator. The electrical machine comprises an air-cooling-arrangement, which circulates air inside the electrical machine.

The electrical machine comprises an liquid-cooling-arrangement, which circulates cooling-liquid inside the electrical machine. The air-cooling arrangement and the liquid-cooling-arrangement are connected by an air-to-liquid heat-exchanger, which is applied to transport heat out from the electrical machine by the cooling-liquid.

According to the invention the stator is cooled by help of a liquid-medium while additionally air is used for cooling of winding-heads of the stator and for the cooling of the rotor.

The cooling-arrangement according to the invention shows a number of advantages.

The stator is cooled efficiently with a liquid-cooling arrangement.

Winding heads of the stator and the rotor itself are cooled with an additional separate circuit, so the lack of the missing direct cooling of the stator as described above is compensated.

The air cooling of the winding-heads of the stator and of the rotor requires a smaller amount of air for cooling-purposes as the systems discussed above according to the state of the art. So a large proportion of ventilation losses are reduced, typically by a factor of ⅓.

The cooling of the stator and of the winding head and/or the rotor is tuned individually in a preferred embodiment, so unbalanced cooling is avoided.

As air is used directly for the cooling inside the electrical machine, large external air-ducts are avoided. It is therefore possible to keep the electrical machine totally enclosed.

In a preferred embodiment the same coolant is circulated through internal radiators and the stator (either parallel or serial), so a simple arrangement is achieved.

BRIEF DESCRIPTION OF THE DRAWINGS

The invention will be described in more detail by help of some figures, while.

DETAILED DESCRIPTION OF INVENTION

Figure 1:
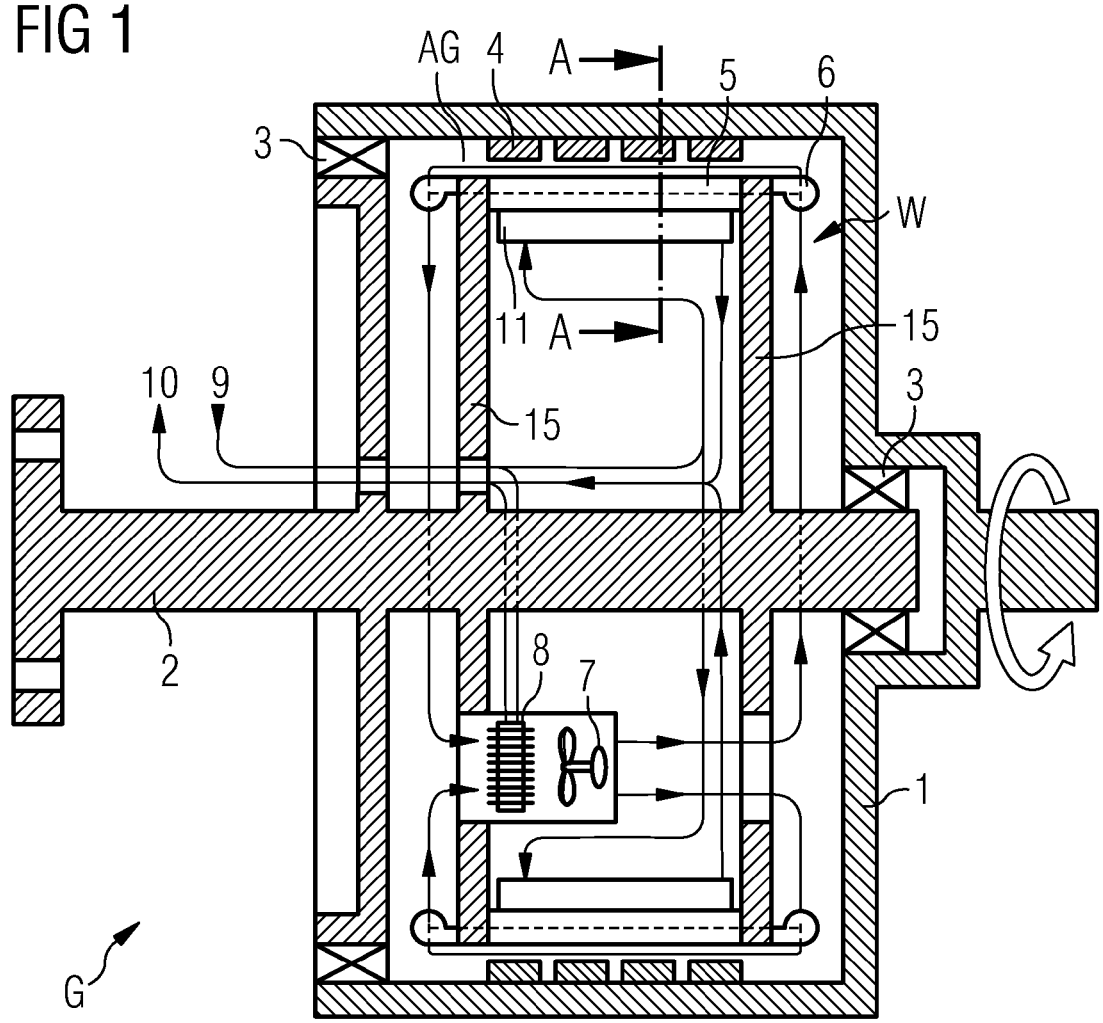
FIG. 1 shows a generator as electrical machine, which is cooled according to the invention.

FIG. 1 shows a generator G in a cross-sectional view, while the generator G is cooled according to the invention.

The generator G consists of an outer rotor 1 and an inner stator 2. The inner stator 2 is connected via bearings 3 with the rotor 1.

The rotor 1 wears a number of magnets 4, so the magnets 4 are located partly into an air-gap AG. The air-gap AG is between the stator 2 and the rotor 1.

The stator 1 consists of a number of stacked laminate-plates 5, while the laminate-plates 5 show a number of slots, which are shown in more detail later. The slots of the laminate-plates 5 carry metal-windings of stator-coils—shown in more detail later.

A part of the stator-coil exceeds the slots of the stacked laminate-plates 5, forming winding-heads 6 of the stator-coil.

The laminate-plates 5 are fixed by two end-plates 15.

There is a fan 7 for air-cooling, while the fan 7 is connected with the stator 2. The fan 7 circulates air through the air-gap AG and through the winding-heads 6 inside the generator G, while the air-circulation occurs as shown along a way w.

There is an air-to-liquid heat-exchanger 8, which is connected with the fan 7 for cooling-purposes.

The heat-exchanger 8 is connected with a cooling-liquid-inlet 9 and with a cooling-liquid-outlet 10, which are used to transport "colder" cooling-liquid to the heat-exchanger 8 and to remove "warmer" cooling-liquid from the heat-exchanger 8 to carry away heat from the air-to-liquid heat-exchanger 8 to an outer side of the generator G.

There are a number of hollow pipes 11, which are in a thermal contact with the laminate-plates 5.

The hollow pipes 11 are made of metal in a preferred embodiment. A first end of these pipes 11 are connected with the cooling-liquid-inlet 9, while a second end of the pipes 11 are connected with the cooling-liquid-outlet 10, so a cooling-circuit is built for the liquid cooling.

The fan 7 circulates cooling-air to cool down the rotor 1 and the winding-heads 6 and to cool down the laminate-plates 5 in a (small) certain extent.

The heat from the air-cooling-system is then transferred to an ambient by help of the heat-exchanger 8, which is connected with the cooling-liquid-inlet 9 and with the cooling-liquid-outlet 10 for that purpose.

So a main part of a cooling-capacity by the cooling-liquid is used for the cooling of the metal-windings, which are located into the slots.

There is a combination of air-cooling on one hand and of liquid-cooling on the other hand.

Figure 2:
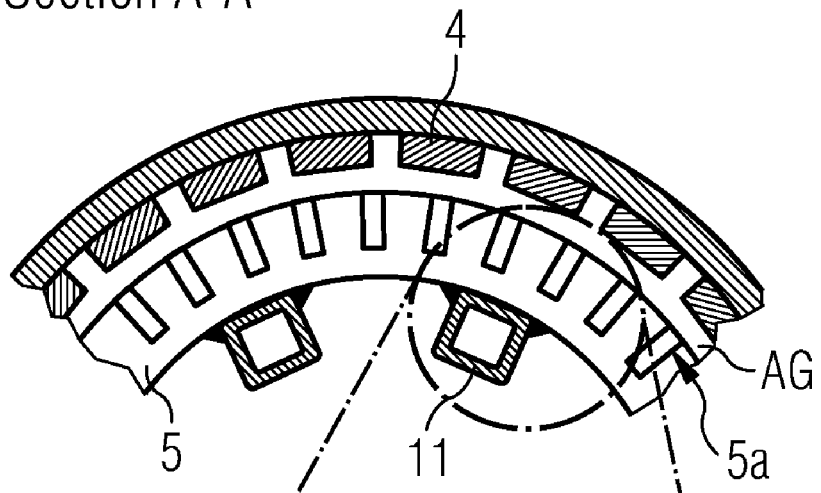
FIG. 2 shows a first detail of the generator referring to FIG. 1.

FIG. 2 shows a first detail along an intersection-line A-A of the generator G referring to FIG. 1.

There is a laminate-plate 5 of the stator 2, while the laminate-plate 5 shows a number of slots 5a.

Between the stator 2 and the rotor 1 is the air-gap AG, while the rotor 1 shows a number of magnets 4, fixed at the rotor 1.

The hollow pipes 11 for the liquid-cooling are connected in thermal contact with the laminate-plates 5 of the generator G.

Figure 3:
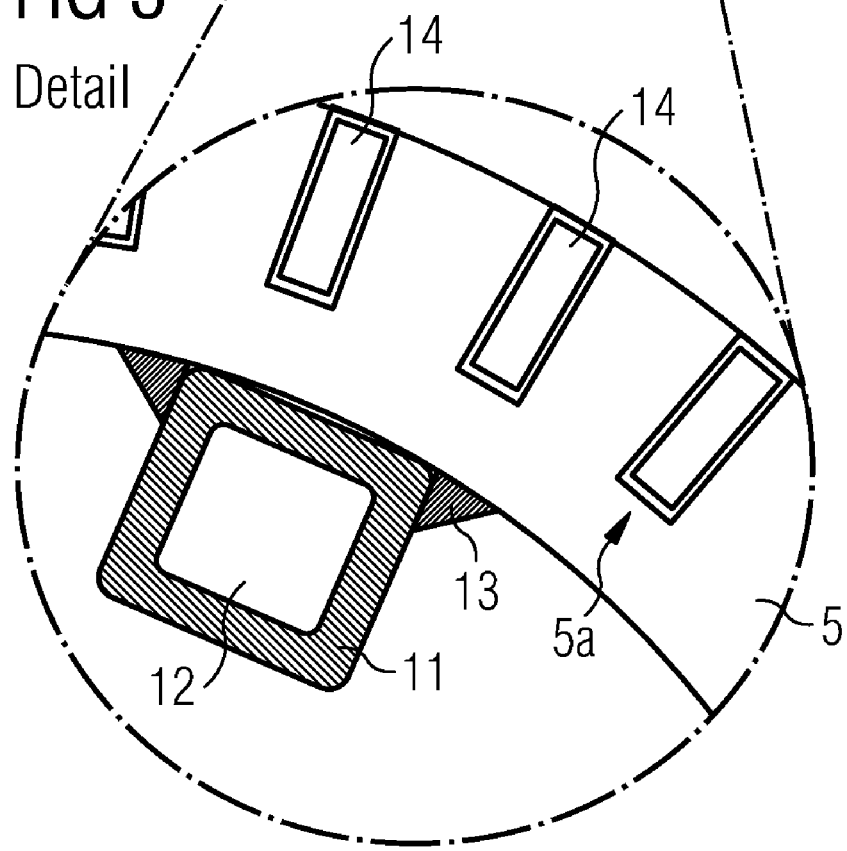
FIG. 3 shows a second detail of the generator referring to FIG. 1 and FIG. 2.

FIG. 3 shows a second detail of the generator G referring to FIG. 1 and FIG. 2.

The slots 5a of the laminate-plate 5 are used to carry metal-windings 14 of a stator-coil (not shown in detail). While the first side of the laminate-plate 5 is faced to the air-gap AG a second side of the laminate plate 5 is in thermal connection with the laminate-plates 5 for cooling-purposes.

The second side is located opposite to the first side and is connected via welding 13 with the hollow pipes 11. So the welding 13 are used for the thermal connection.

Inside this hollow pipe 11 the cooling-fluid 12 is arranged to circulate to and from the heat-exchanger 8.

The hollow pipe 11 is in direct thermal contact with the laminate-plate 5 of the stator 2 via the welding 13.

The described cooling-system with a welding-connection between the hollow-pipes 11 and the second side of the laminate plates 5, while the hollow-pipes 11 are located at the second side of the laminate-plates 5 is a preferred embodiment of the invention.

In another preferred embodiment it is possible to enclose the hollow-pipes 11 by the laminate-plates 5, so the hollow-pipes 11 are forming an integrated part of the laminate-plates 5.

In another preferred embodiment it is possible to integrate the hollow-pipes 11 with the metal windings 14 or with the slots 5a or to combine the embodiments as described above.

In a preferred embodiment only "internal air" of the generator G is circulated inside, so it is possible to encapsulate the generator G completely. Only the liquid-cooling is used to remove the heat out from the generator G.

The invention claimed is:

1. Arrangement for cooling of an electrical machine, comprising:
   an outer rotor comprising a plurality of magnets;
   an inner stator connected via bearings with the outer rotor;
   the inner stator comprising a plurality of laminate plates which are connected by two end plates with the inner stator;
   the laminate-plates comprise a plurality of slots in which are disposed metal windings of a stator coil;
   the stator coil extends beyond the slots to form winding heads of the stator coil;
   wherein the magnets are disposed partly into an air gap which is between the outer rotor and the laminate plates;
   a fan arranged to circulate cooling air inside the electrical machine along a route from the fan, through a first opening through the end plates, through the winding heads, through the air gap, along the end plates, through a second opening through the end plates, through an air-to-liquid heat exchanger, and back to the fan, thus the outer rotor, the winding heads and the laminate plates are cooled and heat is transferred to the heat exchanger;
   where the heat exchanger is connected with a cooling liquid inlet and with a cooling liquid outlet which are used to transport cooling liquid to and from the heat exchanger, thus heat from the heat exchanger is carried away to an outer side of the electrical machine;
   wherein a plurality of hollow pipes are in thermal contact with the laminate plates;
   wherein first ends of the hollow pipes are connected with the cooling liquid inlet and second ends of the hollow pipes are connected with the cooling liquid outlet, thus a cooling circuit is formed for the cooling liquid to cool the hollow pipes and laminate plates;
   wherein the heat exchanger and fan are arranged within a space which is limited by the inner stator, the two end plates and the laminate plates.

2. The arrangement of claim 1, further comprising:
   a first side of the laminate plates comprising the slots faces the air gap, and
   a second side of the laminate plates opposed to the first side is in thermal connect with the hollow pipes.

3. The arrangement of claim 1, wherein the hollow pipes are formed as an integral part of the laminate plates.

4. The arrangement of claim 1, wherein the hollow pipes are integrated with the metal windings or with the slots of the laminate plates.

5. The arrangement of claim 1, wherein the hollow pipes are made of metal or ceramic.

6. The arrangement of claim 1, wherein the electrical machine is a generator which is located inside a nacelle of a wind turbine.

7. The arrangement of claim 1, wherein the electrical machine is totally encapsulated by a shell so only air within the electrical machine is circulated by the fan.

* * * * *